Figure 1:
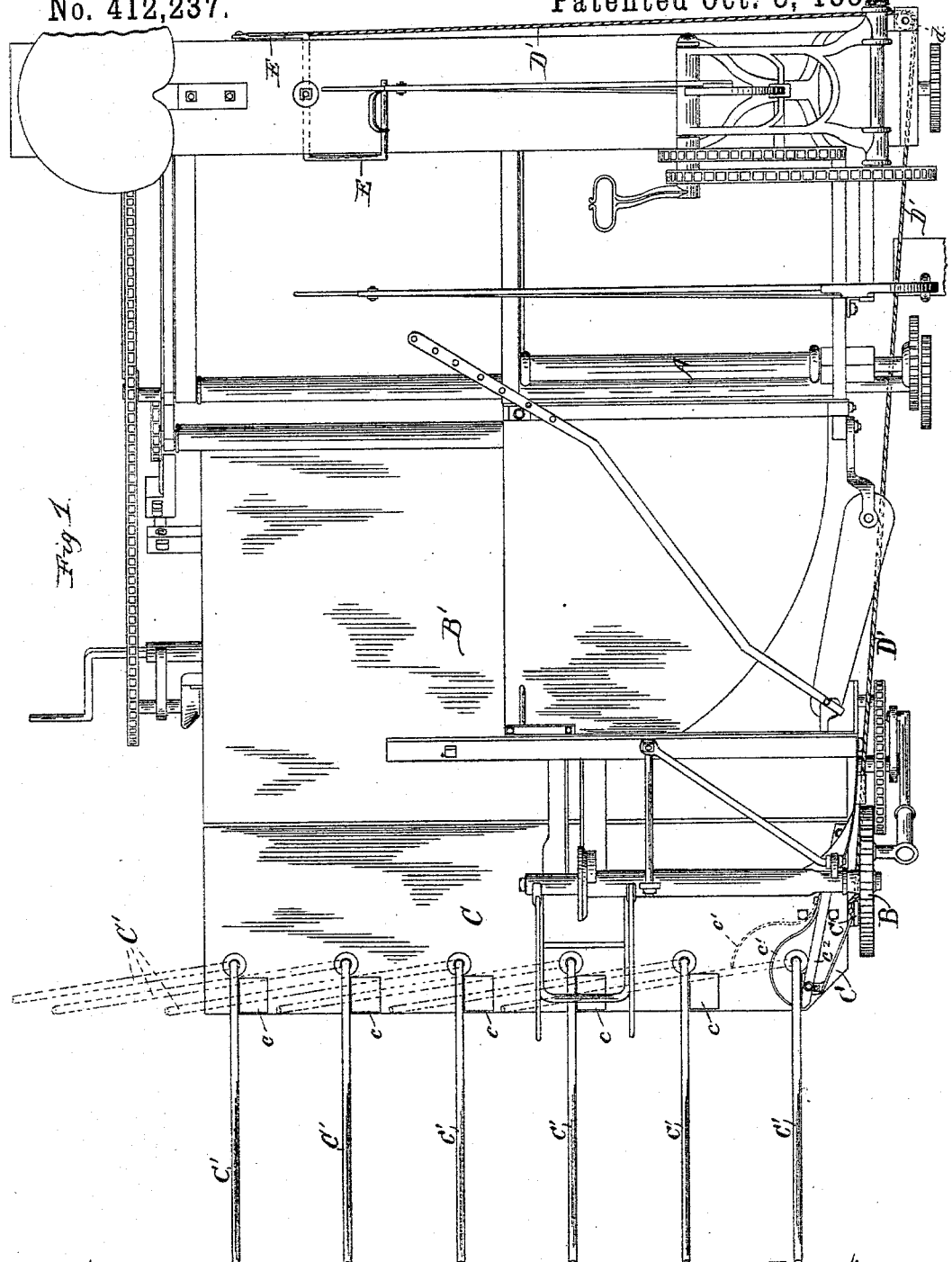

(No Model.) 2 Sheets—Sheet 1.

W. W. BURSON.
SHEAF CARRIER.

No. 412,237. Patented Oct. 8, 1889.

Witnesses:
E. T. Dowling.
Will W. Burson

Inventor:
William Worth Burson (No Model.) 2 Sheets—Sheet 2.
W. W. BURSON.
SHEAF CARRIER.
No. 412,237. Patented Oct. 8, 1889.
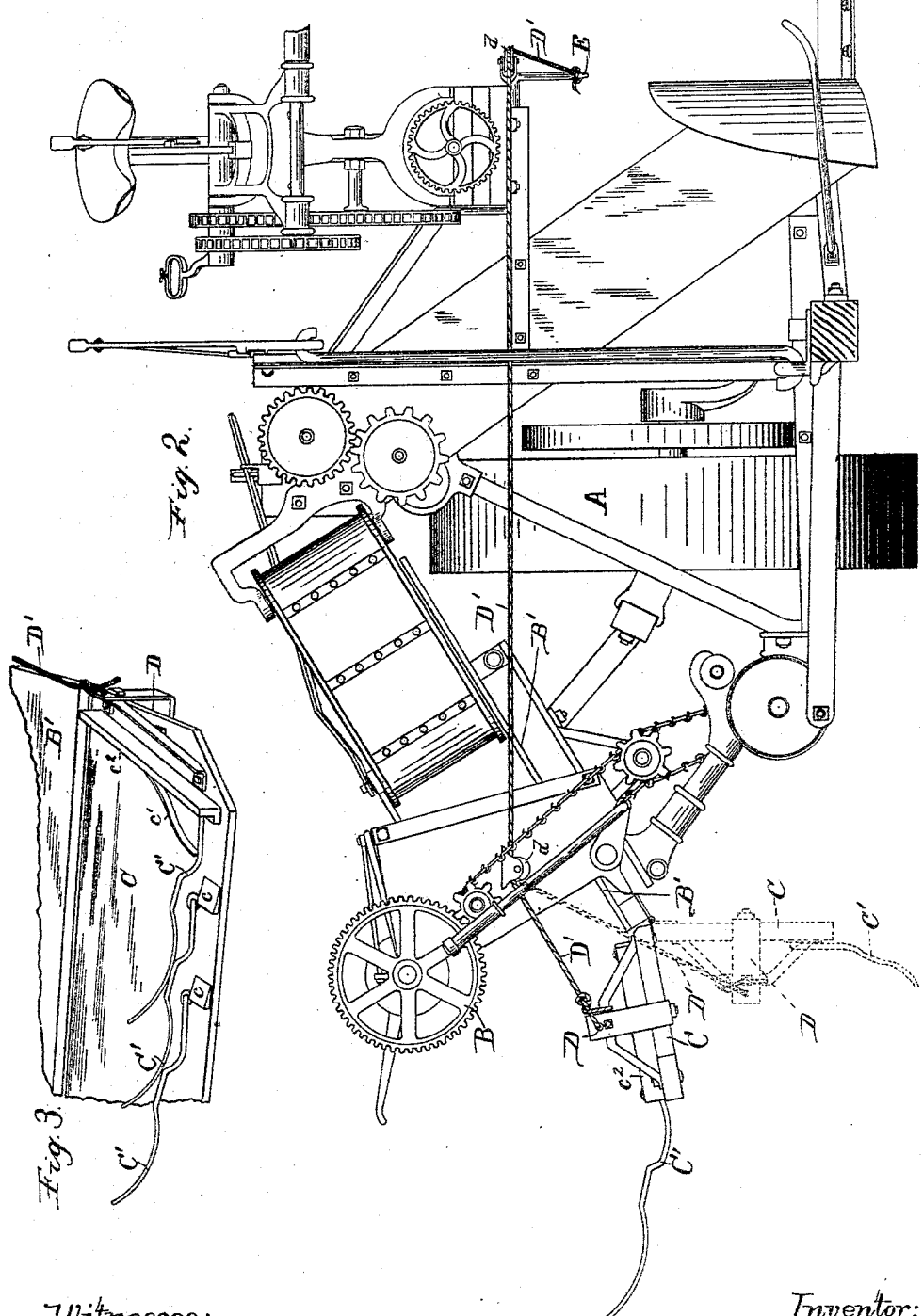
Witnesses:
E. T. Dowling.
Will. W. Burson.
Inventor:
William Worth Burson.

UNITED STATES PATENT OFFICE.

WILLIAM WORTH BURSON, OF CHICAGO, ILLINOIS.

SHEAF-CARRIER.

SPECIFICATION forming part of Letters Patent No. 412,237, dated October 8, 1889.

Application filed May 10, 1889. Serial No. 310,265. (No model.)

*To all whom it may concern:*

Be it known that I, WILLIAM WORTH BURSON, a citizen of the United States, residing at Chicago, in the county of Cook and State of Illinois, have invented a new and useful Sheaf-Carrier for Harvesters, of which the following is a specification.

My invention relates to that class of sheaf-carriers which are attached to self-binding harvesters; and the objects of my invention are, first, to provide a carrier of minimum weight and cost; second, to secure a carrier which shall carry the sheaves equal to the best in use and dump them in bunches on the ground more perfect in all conditions of grain than has heretofore been done. I attain these objects by the mechanism illustrated in the accompanying drawings, in which—

Figure 1 is a top view of the carrier and that part of the harvester connected therewith. Fig. 2 is a front end view. Fig. 3 shows a part of the receiving-table, looking at its outer edge.

Similar letters refer to like parts throughout the several views.

In the drawings, A represents a part of the harvester, which is of the usual form, and is only introduced here to show its relation to the carrier, and needs no detailed description here.

B represents the binder, of the usual form, attached to the harvester.

B' is the binder-deck.

According to the organization of the mechanism here shown the receiving-table C is hinged to the binder-decks B' on the lower edge, which construction is recommended, though it is very evident that it could be hinged to the harvester-frame or an extension therefrom. Table C is held in receiving position by the operating-cord D', extending from its fastening on arm D over the friction-sheaves $d$ to the foot-lever E, conveniently placed to be operated by the driver, Figs. 1 and 2. Since the receiving-table C is adapted to dump its load by dumping its outer edge to a vertical or nearly vertical position, it is evident that the width of this receiving-table will be limited to what will be a safe distance for its lower edge from the ground when the harvester is working on its lowest cut and the table in its vertical position to discharge its load.

In the organization of the harvester and binder now in common use the receiving-table alone is too narrow to carry the number of sheaves desirable to be dropped in one place, and to remedy this defect I pivot the extension-rods C' near the outer edge of the receiving-table. These rods are pivoted to the receiving-table on pivots substantially perpendicular to its upper surface and are adapted to swing backward freely, but are limited in their forward movement by the stops $c$ to about a right angle to the line of movement of the harvester. The table C is provided at its front end with the guard $c^2$ to prevent the sheaves from sliding forward endwise, as also to strengthen it.

Having described the general construction of my carrier, I wish to call attention to some of its novel features.

The receiving position of table C is nearly horizontal, inclining somewhat downward at its outer side. The extension-rods are preferably pivoted on the upper side of the table and must be bent upward enough to hold the sheaves. I prefer to make an upwardly-inclined bend in the rod, beginning at the edge of the table, when the rods are extended in a receiving position, as seen in Figs. 1 and 3. By reference to Fig. 3 it is seen that the sheaf passing from the table C must necessarily bring the receiving-rods C' into position to hold its load until the table is dropped and the sheaves discharged. When the receiving-table C is being raised from its vertical position, the weight of the extension-rods tends to bring them into their sheaf-holding position. A spring $c'$ is shown acting upon the front rod, Figs. 1 and 2, which tends to bring it into receiving position.

The receiving-table in discharging position is nearly vertical, and the hinges of the extension-rods are drawn toward the harvester the width of the table C, while the rods swing backward, permitting a free discharge of the sheaves. The inclinations of table C and rods C' in discharging position depend upon the construction of the harvester and the height at which it is adjusted to cut. With some, when on the "high cut," the table and rods would be nearly or quite vertical in discharging position, while with others on the "low cut" the rods would fold well back to the edge of the table in discharging the sheaves. The table C is brought into receiving position by the driver through means of the foot-lever E and operating-cord D'; but this does not necessarily bring the extension-rods of the table into their sheaf-receiving position, which is done by the sheaves pressing against the upwardly-bent rods, extending them outwardly as they are loaded. When not loaded, they are free to swing backward on the receiving-table, all or singly, each having an independent movement without lowering the said table or by any other act of the driver.

Some of the points of distinction between this carrier and the fingered carriers, which on a superficial view it seems to resemble are—

First. The receiving-table C, hinged preferably to the binder-deck, is an excellent carrier alone so far as its width extends, and makes a support for the extension-rods also, which makes a lighter, cheaper, and simpler carrier than the common fingered carrier.

Second. The fingered carriers now in use have the fingers connected together, so that they are compelled to move in unison, while mine have not such connection, as each rod has an independent movement, and hence saves the expense of said connection.

Third. In all fingered carriers, so far as I know, the fingers are extended by positive mechanical means, while my extension-rods are brought into receiving position when the table is raised by the action of the sheaf in being discharged by the binder, which simplifies the carrier by omitting from the construction the means for extending the sheaf-holding rods.

Fourth. By reference to Fig. 2 (dotted lines) it will be readily seen that the discharging position of my carrier differs from that of the fingered carriers in this, that the table C is substantially vertical when discharging, and the hinges of the receiving-rods are thereby drawn to that extent toward the harvester, and thus the rods are readily disengaged from the sheaves by the advance movement of the harvester.

Fifth. In the fingered carrier the fingers are raised and extended from the discharging position against whatever obstruction may be in the way, and the weight of the extended fingers adds to the labor of bringing the carrier into receiving position, while in mine the extension-rods fold to the lower edge of the table C and have no force, except gravity, to tend to extend them, so that they yield backward from any obstruction, and being close to the horizontal hinge of the carrier are easier to raise than if extended.

Various changes can be made in the within-described construction of my mechanism without departing from the scope of my invention.

What I desire to claim as my invention and secure by Letters Patent is—

1. In combination with a self-binding harvester, a receiving-table hinged thereto at right angles to the line of the finger-bar, with means for operating the same, provided with extension-rods pivoted substantially perpendicularly to said table, adapted to receive the sheaves from the binder and to carry them until dumped upon the ground in bunches convenient for shocking, substantially as set forth.

2. In combination with a self-binding harvester, a receiving-table hinged thereto, as described, with means for operating the same, provided with extension-rods pivoted substantially perpendicularly thereto, said rods provided with an upwardly-inclined bend and each permitted to move independent of its fellows, the table and rods being adapted to receive the sheaves from the binder, and by the action of the sheaves upon the rods to swing them to their extended position to carry the sheaves and dump them in bunches upon the ground convenient for shocking, substantially as specified.

3. In combination with a self-binding harvester, a receiving-table hinged thereto, as described, with means for operating the same, said table provided with extension-rods pivoted substantially perpendicularly thereto and raised above the plane of the table throughout the greater part of their length and each having a movement independent of its fellows, said table and rods being adapted to receive and carry the sheaves and to dump them on the ground convenient for shocking, substantially as set forth.

4. The combination of a self-binding harvester, the table C, hinged, as described, thereto, the extension-rods C', pivoted perpendicularly thereto, and the operating-cord D', connecting the said table with the foot-lever E, said table and rods being adapted to receive the sheaves from the binder, to carry them together, and to dump them in bunches on the ground, substantially as set forth.

5. The combination of a self-binding harvester, the table C, hinged thereto, as shown, with means whereby the driver can operate the same, provided with stops c, and the extension-rods C', pivoted perpendicularly to said table, substantially as set forth.

WILLIAM WORTH BURSON.

Witnesses:
 LEW. E. CURTIS,
 MACK A. CLAFLIN,